United States Patent [19]

Hammond

[11] Patent Number: 4,562,934
[45] Date of Patent: Jan. 7, 1986

[54] GLASS FIBER REINFORCED RESIN TANK WITH PARTICULAR JOINT STRUCTURE

[75] Inventor: George K. Hammond, Toledo, Ohio

[73] Assignee: Owens-Corning Fiberglas Corporation, Toledo, Ohio

[21] Appl. No.: 699,211

[22] Filed: Feb. 5, 1985

Related U.S. Application Data

[63] Continuation of Ser. No. 605,034, Apr. 30, 1984.

[51] Int. Cl.⁴ .............................................. B65D 25/14
[52] U.S. Cl. .................................... 220/75; 220/5 A; 220/80
[58] Field of Search .................. 220/75, 80, 1 B, 4 B, 220/4 E, 5 R, 5 A

[56] References Cited

U.S. PATENT DOCUMENTS 2,457,002 12/1948 Spiro ...................................... 220/80
3,036,728 5/1962 Gibb .................................. 220/80 X
3,428,347 2/1969 Tramontini ........................... 220/80
3,669,816 6/1972 Smith et al. ....................... 220/80 X
3,692,335 9/1972 Vickers et al. .................... 220/80 X
3,739,833 6/1973 Rausch .............................. 220/80 X
3,889,836 6/1975 Anderson ........................... 220/5 A
4,004,706 1/1977 Guldenfels et al. .................... 220/3
4,223,498 9/1980 Ventrice ........................... 220/80 X Primary Examiner—Steven M. Pollard
Attorney, Agent, or Firm—Ronald C. Hudgens; Patrick P. Pacella; Paul J. Rose

[57] ABSTRACT

A corrosion-resistant gasket or at least a portion thereof on the inner side of the joint between two tank halves having corrosion-resistant liners protects the non-corrosion-resistant structural walls at the inner ends of the tank halves and also the non-corrosion-resistant external lay-up. The gasket can be applied from outside the tank during assembly of the tank halves, and the need for a manway to apply a corrosion-resistant internal lay-up is eliminated.

3 Claims, 5 Drawing Figures

# GLASS FIBER REINFORCED RESIN TANK WITH PARTICULAR JOINT STRUCTURE

This is a continuation of application Ser. No. 605,034, filed on Apr. 30, 1984.

TECHNICAL FIELD

This invention relates generally to glass fiber reinforced resin storage tanks, and more particularly, to the joint between two tank halves.

BACKGROUND ART

Glass fiber reinforced resin tanks are typically made of isophthalic resin, chopped glass strands, and a filler such as sand. External ribs of woven glass roving, glass filament windings, and resin are usually provided. Generally, a resin-rich liner is also provided consisting of about a 20 mil thickness of resin with a surface mat and an 80 mil thickness of resin and chopped glass strands. When a tank is to be used to store corrosive liquids which attack isophthalic resin, polyester or vinylester resin is used as the liner resin. The tanks are made of two halves generally disclosed in U.S. Pat. No. 3,700,512, joined by an external lay-up of resin and a plurality of interleaved layers of woven glass roving and chopped strand mat. Prior to my invention, tanks for corrosive liquid service were also provided at the joint with an internal lay-up of interleaved layers of woven glass roving and chopped strand mat impregnated with polyester or vinylester resin. For application of this internal lay-up, one of the tank halves had to be provided with a manway, which added considerably to the cost of the tank.

DISCLOSURE OF THE INVENTION

In accordance with the invention, a joint structure is provided in a tank for corrosive liquid service, wherein no internal lay-up is required, and therefore no manway is required, but the isophthalic resin portion of the tank at the joint is nevertheless shielded from corrosive liquids, by a corrosion resistant flexible gasket or sealing member made of a suitable resin such as polyethylene or polyvinyl.

BRIEF DESCRIPTION OF THE DRAWINGS

The invention is more fully explained hereinafter with reference to the accompanying drawings wherein.

BEST MODE OF CARRYING OUT THE INVENTION

Figure 1:
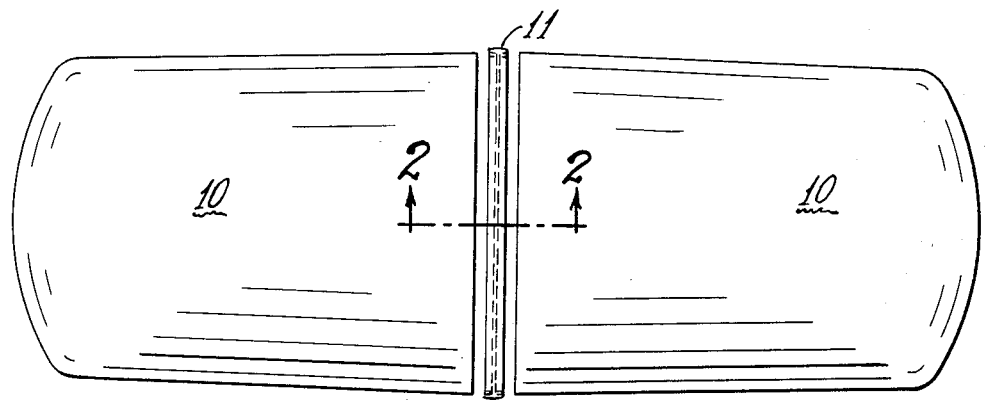
FIG. 1 is a view of two generally cylindrical tank halves and a central gasket, prior to assembly in accordance with the invention.

With reference to the drawings, FIG. 1 shows two tank halves 10 and a gasket 11 just prior to being assembled in accordance with the invention. The normal external ribs on the tank halves 10 are omitted. The tank halves 10 are shown with tapered sidewalls, as though made on a tapered mandrel such as shown in U.S. Pat. No. 3,700,512, but they could just as well be truly cylindrical and made on a collapsible mandrel such as shown in U.S. Pat. No. 4,233,020.

Figure 2:
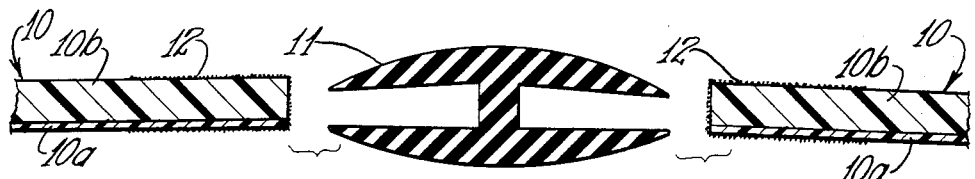
FIG. 2 is an enlarged fragmentary sectional view taken generally along the line 2—2 of FIG. 1.
Figure 3:
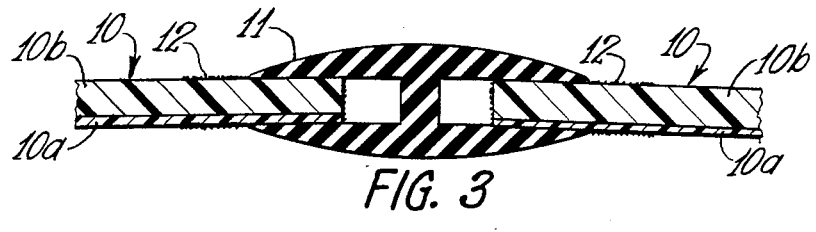
FIG. 3 is a view similar to FIG. 2, but showing the items partially assembled.
Figure 4:
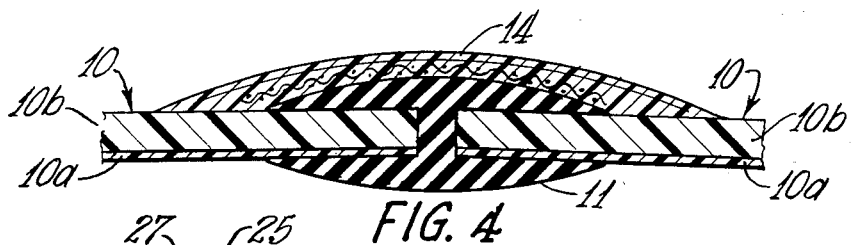
FIG. 4 is a view similar to FIG. 2, but showing the tank halves fully assembled with the gasket and also showing an external lay-up.

FIG. 2 shows that the gasket 11 is generally H-shaped in cross section. The gasket material may be polyethylene, polyvinyl, polytetrafluoroethylene, or other suitable material resistant to chemicals that might be stored in the tank. The tank halves 10 include polyester or vinylester resin in a liner 10a and isophthalic resin in a structural wall 10b. Glass fiber reinforcement and sand filler (see "Background Art") are not shown. The open ends of the tank halves 10 are coated with an adhesive 12 and the gasket 11 is pressed on the coated open ends, as progressively shown in FIGS. 3 and 4. An external lay-up 14 of isophthalic resin is then applied to hold the tanks together, the glass fiber mat reinforcement in the lay-up (see "Background Art") being only partially shown.

The gasket 11 shields the isophthalic resin, in the structural wall 10b at the open ends of the tank halves 10, from corrosive fluid in the tank.

Figure 5:
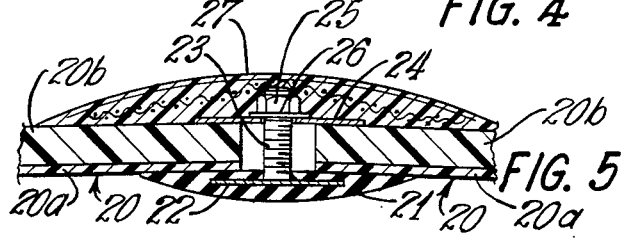
FIG. 5 is a view similar to FIG. 4, but showing an alternative embodiment of the invention.

FIG. 5 shows an alternative embodiment of the invention wherein two tank halves 20 include polyester or vinylester resin liners 20a and isophthalic resin structural walls 20b, glass fiber reinforcement and sand filler not being shown. A chemically resistant gasket 21 is provided at the inside of the joint. The gasket 21 is formed around an inner metallic band 22 having spaced threaded studs 23 projecting outwardly therefrom at regular intervals all around the peripheries of the tank halves 20. An outer metallic band 24 slotted to receive the studs 23 is initially held in place by washers 25 and nuts 26. Initially the nuts 26 are loose enough for assembly of the gasket 21, band 22, studs 23, band 24, washers 25 and nuts 26 with the tank halves 20 from the outside of the tank formed thereby. Thereafter, the nuts 26 are tightened on the studs 23 to firmly clamp the gasket 21 in place at the inside of the joint and protect the isophthalic resin in the structural walls 20b at the open ends of the tank halves 20 from later attack by corrosive liquids stored in the tank. An external lay-up 27 of isophthalic resin and interleaved layers of woven glass roving and chopped strand mat is then applied over the joint to secure the tank halves 10 together, the glass fiber reinforcement in the lay-up 27 being only partially shown.

In both embodiments, the gasket protects the isophthalic resin at the open ends of the tank halves and in the external lay-up from attack by corrosive liquids stored in the tank, and no manway is required in the tank to permit work inside the tank.

I claim:

1. In a glass fiber reinforced resin tank adapted to contain corrosive liquids and being of the type wherein two tank halves, each having an inner liner comprising corrosion resistant resin and an outer structural wall portion comprising corrodible resin exposed at an open end of the tank half, are secured relatively to each other, with open ends adjacent each other in closely spaced, non-abutting relationship, by means including an external lay-up of reinforced resin, an improvement over the former construction wherein at least one of the tank halves was provided with a manway to permit application of an internal lay-up of reinforced corrosion resistant resin in bridging relationship to the open ends of the tank halves, said improvement comprising a flexible gasket installed from outside the tank before application of the external lay-up and sealed to the liners of said tank halves around their inner peripheries respectively adjacent their open ends, the gasket comprising corrosion resistant resin and shielding the exposed structural wall portions respectively at the open ends of the tank halves from corrosive liquid when corrosive liquid is stored in the tank.

2. An improved tank as claimed in claim 1 wherein the gasket is generally H-shaped in cross section and has the open end portions of the tank halves adhesively secured respectively in opposite end portions thereof.

3. An improved tank as claimed in claim 1 including an inner metallic band disposed in the tank, extending around the inner peripheries of the tank halves respectively adjacent their open ends, being encased in the gasket, and having a plurality of threaded studs projecting outwardly therefrom between the tank halves to the outside of the tank, the studs being spaced from each other circumferentially of the tank, an apertured outer metallic band extending around the outer periphery of the tank and being mounted on said studs, and a plurality of nuts threaded respectively on said studs over the outer band, the external lay-up covering the outer band, the nuts, and the outer end portions of the studs.

* * * * *